United States Patent [19]
Boyd et al.

[11] 3,773,091
[45] Nov. 20, 1973

[54] VACUUM POWER LIQUID REMOVAL APPARATUS

[76] Inventors: Kenneth D. Boyd, 619 S. Marlyn Ave.; Charles L. Wayland, 214 Nanticoke Rd., both of Baltimore, Md. 21221

[22] Filed: May 13, 1971

[21] Appl. No.: 143,151

[52] U.S. Cl................. 141/42, 137/202, 137/205, 137/331, 141/46, 184/1.5
[51] Int. Cl............................................ B65b 31/02
[58] Field of Search ............... 4/192; 137/202, 205, 137/330, 331, 519.5, 587, 614.16, 614.17; 141/18, 39–43, 46, 59, 61, 198; 169/31 R; 184/1.5; 222/465, 467; 16/2

[56] References Cited
UNITED STATES PATENTS

| | | | |
|---|---|---|---|
| 3,113,584 | 12/1963 | Howard | 137/205 X |
| 1,986,476 | 1/1935 | Ironside | 184/1.5 UX |
| 571,735 | 11/1896 | Winters | 137/614.16 X |
| 3,612,089 | 10/1971 | Beguiristain | 137/202 X |
| 3,633,223 | 1/1972 | Killias | 4/192 |
| 3,628,559 | 12/1971 | Branko | 137/202 |
| 1,243,454 | 10/1917 | Spaleck | 137/519.5 X |
| 895,897 | 8/1908 | Saxton | 169/31 R UX |
| 2,756,829 | 7/1956 | Phillips | 169/31 R X |

FOREIGN PATENTS OR APPLICATIONS

| | | | |
|---|---|---|---|
| 722,617 | 1/1955 | Great Britain | 141/42 |
| 570,996 | 2/1933 | Germany | 141/18 |

*Primary Examiner*—Houston S. Bell, Jr.
*Attorney*—Lowe & King

[57] ABSTRACT

A system is provided for transferring liquid between two chambers by use of differential pressure established by a vacuum in one chamber and including an integral dual purpose valve assembly to allow evacuation of one chamber but preventing liquid contamination of the vacuum source. The valve assembly mounted on the top of the container includes check valve means to regulate the gas flow and float valve means responsive to a predetermined level of liquid to prevent liquid transfer after said level is reached. The float member has a specific gravity less than the liquid but a weight sufficiently light to be supported by the vacuum in the connecting passage between the two valve means so as to prevent inadvertent reset of the float valve means upon changing of the liquid level. Reset is obtained by utilizing momentum of the float valve member in response to a sharp rap on the valve assembly; said assembly extending at an acute angle with respect to the vertical and including a resilient ball free to roll along the inside surface of a confining tubular housing. A shock absorbing mount for the valve assembly prevents inadvertent reset of the float valve due to outside jarring forces and the liquid is coated on the float valve ball to assist in forming a leak-proof seal as the ball rolls up the inside of the tubular housing. Atmospheric pressure is introduced and liquid cutoff to the container after filling to further prevent inadvertent reset and inadvertent fresh liquid transfer from said chamber. Centrally mounted T connection for the liquid transfer is protected by dual handles for portability and the pouring spout with stopper is provided for disposing of transferred liquid.

The present invention relates to liquid transfer apparatus, and more particularly, to improvements in such apparatus utilizing a vacuum source as the means of power.

10 Claims, 4 Drawing Figures

United States Patent [19]
Boyd et al.
[11] 3,773,091
[45] Nov. 20, 1973
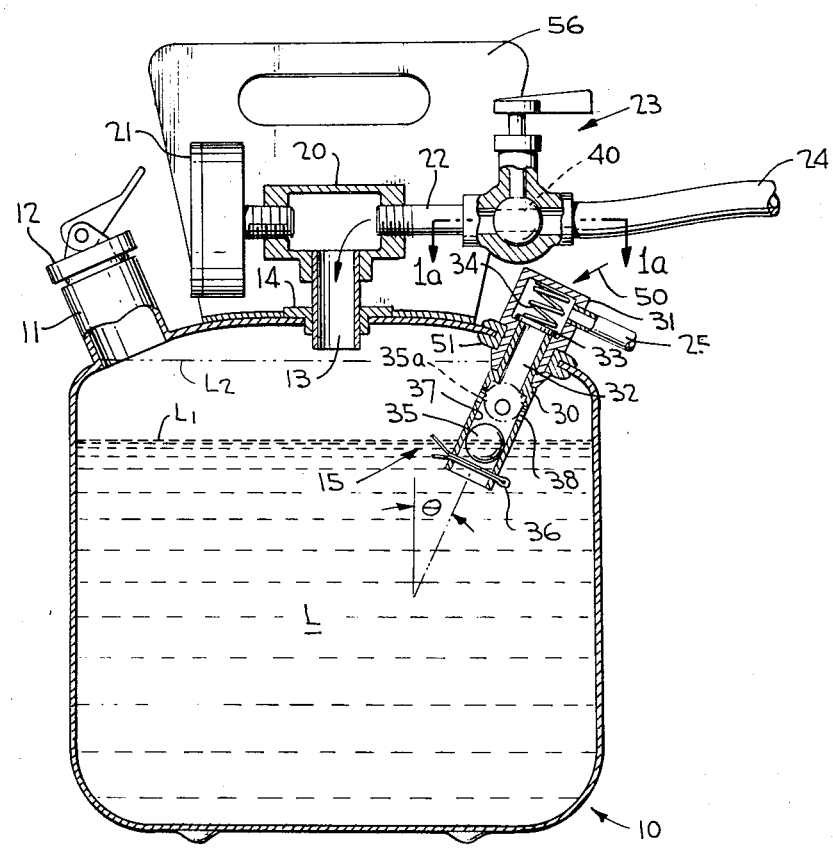

Patented Nov. 20, 1973 3,773,091
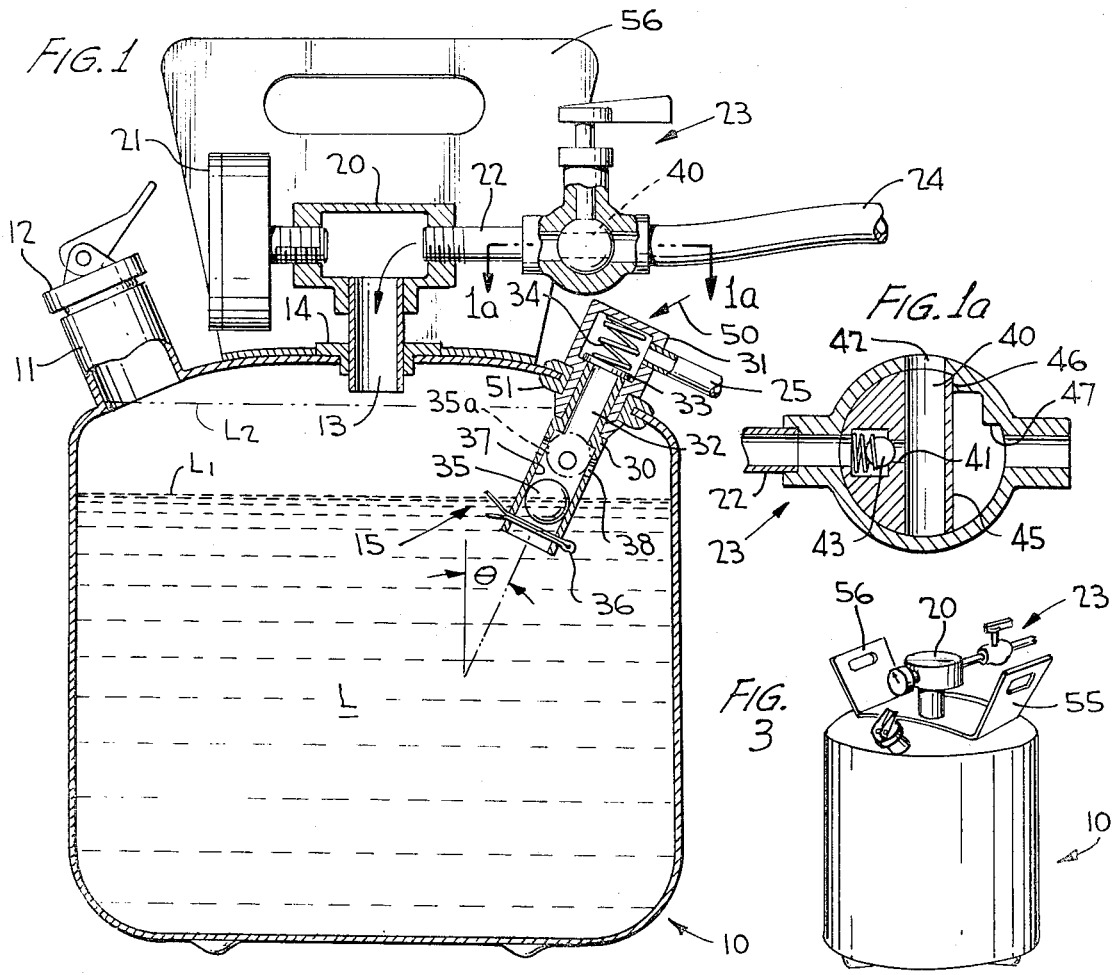
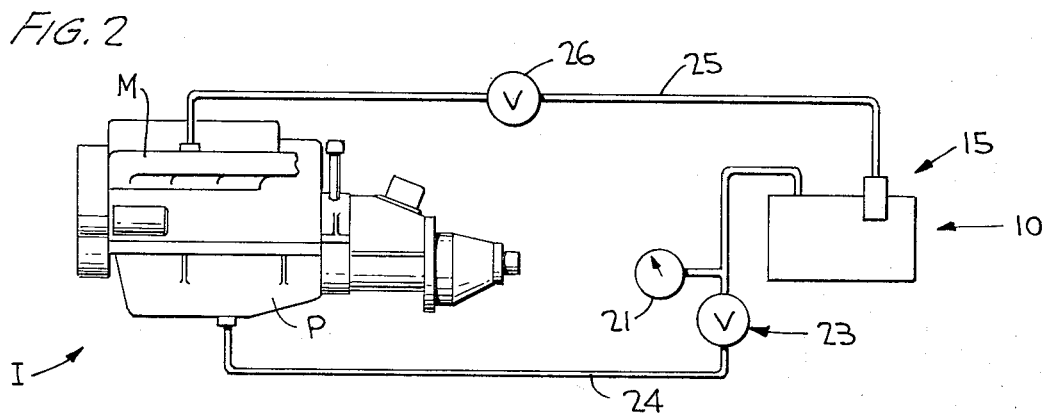
INVENTORS,
KENNETH D. BOYD
CHARLES L. WAYLAND
BY
Lowe & King
ATTORNEYS

VACUUM POWER LIQUID REMOVAL APPARATUS

BACKGROUND OF THE INVENTION

There have been previous attempts to transform a known form of liquid transfer concept to practical hardware where it is desired to remove a liquid from one chamber and place the same in a sump container, usually for disposal. A common instance in which such a system can be placed in beneficial use is in the automotive or marine engine field, and more specifically, for removing oil from the crankcase of an internal combustion engine and placing the same into a sump container for which it can be conveniently disposed of. Especially in marine engines, it is difficult, if not impossible, to drain the oil in the usual manner because of the confining nature of the installation of the motor in the hold of the boat. A source of vacuum is readily available on an internal combustion engine at the intake manifold to power such a liquid transfer system.

Exemplary of the prior art in this field is the U.S. Pat. to Dunn et al. No. 2,536,492, issued Jan. 2, 1951. The system shown in this patent and other prior systems of which we are aware are subject to certain shortcomings that limit the efficiency and the desirability of operation. Most importantly, the liquid transfer systems of the prior art are not made foolproof or fail-safe in that there is nothing to prevent liquid, such as oil, being drawn into the vacuum source, or manifold of the engine providing the vacuum as the sump container becomes filled. In the event that this should happen, the vacuum source might be severely damaged. In the case of an internal combustion engine, cracked pistons or at least fouling of the spark plugs and coating of the combustion chamber with burnt carbon, results. There must also be the capability of preventing inadvertent reset of the valve designed to prevent this flow of liquid. Also, once the new oil or other liquid is replaced in the crankcase or other chamber, some provision must be made to prevent withdrawing of the fresh liquid inadvertently.

It would thus be highly desirable to provide a liquid transfer system that would have the above features and thus be acceptable to the purchasing public. In one environment, the system would give the boating enthusiast an exceptionally easy way to change the oil in his engine. As a result, the engine is kept in top operating condition and considerably less polluting and less harmful to the ecology, whereas before it was not since the oil would not have been changed as often because it was too difficult or the transfer systems available had the shortcoming of possibly causing injury to the engine. Furthermore, an oil change system to be desirable should prevent spillage into the hold of the boat so that the oil won't be pumped out by the bildge pump thereby further preventing water pollution. Finally, the sump container should form a handy device by which the boat owner is able to dispose of the liquid in a proper manner.

OBJECTIVES OF THE INVENTION

Thus, it is one object of the present invention to provide a fluid transfer system that overcomes the shortcomings of the prior art and has the desirable features as mentioned above.

It is another object of the present invention to provide a fluid transfer system wherein foolproof and fail-safe valve means is provided to prevent injury to the vacuum source used to power the system.

It is a still another object of the present invention to provide a valve assembly to prevent liquid from entering the vacuum system, which valve assembly includes a float valve and a check valve, the float valve not being subject to inadvertent reset.

It is still another object of the present invention to provide a liquid transfer system having a minimum number of valves of simple construction but so placed in the combination to insure foolproof operation.

It is still another object of the present invention to provide a system having a sump container adapted for semi-permanent installation or for complete portability to allow convenient transfer of liquid and prevention of spillage and pollution.

BRIEF DESCRIPTION OF THE PREFERRED EMBODIMENT

Briefly, the system transfers liquid from one chamber to a sump container by establishing a vacuum in the container and allowing the ambient pressure to thus transfer the liquid through suitable liquid transfer means. As the container reaches the full level, a novel valve assembly prevents the flow of liquid into the vacuum system, and once set, the valve is maintained in position to prevent inadvertent reset. More specifically, the valve assembly includes a check valve member and a float valve member and respective seats with a connecting passageway therebetween which is evacuated and maintained in that condition. This assures that the float valve member is held against the seat until positive reset action is taken by the operator of the system.

Atmospheric pressure is returned to the container after it is filled to assure that sufficient differential pressure across the float member is maintained even upon removal or lowering of the liquid level. The float valve member is in the form of a resilient ball free to float and roll along the inside surface of a confining tubular housing. This action coats the ball with liquid to gain a better seal upon seating. Breaking of the seal when reset is desired is accomplished by allowing initial separation action at the upper side of the ball. Such coating and separation action is assured by the angular positioning of the valve assembly (approximately 22°) within the container.

Reset of the valve may be provided in a novel manner by providing a float ball sufficiently heavy that the momentum of the same will cause such disengagement as described at the seat upon providing a sharp blow or rap to the valve assembly housing. The housing is mounted in a combination rubber cushion and sealing grommet to prevent outside jarring forces of inadvertently resetting the valve.

A centrally mounted T connection for the liquid transfer means is protected from the side by dual handles that also afford portability. A pouring spout with sealing stopper is provided opposite the valve assembly for disposing of the liquid collected.

Still other objects and advantages of the present invention will become readily apparent to those skilled in this art from the following detailed description, wherein we have shown and described only the preferred embodiment of the invention, simply by way of illustration of the best mode contemplated by us of carrying out our invention. As will be realized, the invention is capable of other and different embodiments, and its several details are capable of modification in various obvious respects, all without departing from the invention. Accordingly, the drawings and description are to be regarded as illustrative in nature, and not as restrictive.

BRIEF DESCRIPTION OF THE DRAWING

FIG. 1 is a cross-sectional view showing the sump container and the valve arrangement constituting a preferred form of the inventive concept;

FIG. 1a is a detailed sectional view of one valve taken along line 1a—1a of FIG. 1;

FIG. 2 is a schematic diagram of an engine oil removal system as applied to an internal combustion engine in accordance with the present invention; and FIG. 3 is a perspective view showing the sump container of the preferred embodiment.

DETAILED DESCRIPTION OF THE PREFERRED EMBODIMENT

With reference now to FIG. 1 of the drawing, the concepts of the invention may be viewed and described more fully. In this figure, a sump container 10 is shown with a supply of liquid L contained therein. The container includes a pouring spout 11 for discharge of the liquid L after it has been collected and a conventional pressure sealing stopper 12 is provided to make the container airtight. The container 10 also has an entry for liquid through a nipple 13 suitably sealed by an annular seal 14. Finally, a valve assembly 15 forms an egress path for gas or air to allow evacuation of said container 10, as will be described more in detail later. The system may be semi-permanent and remain in the place of use, such as, on the boat, or may be completely portable.

The nipple 13 is connected through a T connection 20 to a vacuum gauge 21 and a liquid transfer means in the form of a branch pipe 22. Completing the liquid transfer means to the container 10 is a manually operable cutoff valve, generally designated by the reference numeral 23, and a flexible tube 24 connected to the inlet side thereof.

With reference to FIG. 2, the overall combination of the system in the environment of an internal combustion engine I may be reviewed. However, it is first emphasized that the system is useable with other similar liquid arrangements wherein it is desired to transfer liquid from one chamber to another or a sump container. For example, the system with its simplicity and ability to avoid spillage and contamination would be an ideal system for transferring sterile liquids, such as blood or the like.

But referring to the engine I, as being a preferred environment for use of the system, it can be seen that the liquid transfer means including the tube 24, the valve 23 and the vacuum gauge 21 may be connected at the input end to the oil pan P of said engine I. As already explained, the exit end of the liquid transfer means connects to the sump container 10.

The valve assembly 15, constructed in accordance with the present invention, is also interconnected with the container 10 and forms a gas transfer means with the tubing 25 (see both FIGS. 1 and 2). The tubing 25 may be provided with auxiliary cutoff valve 26 before being connected to intake manifold M of the engine I.

Thus, assuming the auxiliary cutoff valve 26 is in the open position, the engine I is or has been running and the container 10 is evacuated, the ambient pressure in the pan P will force the oil through the tube 24, the valve 23 (also open) and into the sump container 10. The improvement of the present invention has to do with the valve 15, 23 and the combination of the valves with the sump container, as will now be discussed.

As the pan P is emptied of liquid by the system, and especially if the liquid in the container 10 was not previously disposed of, the level of the liquid L in the container 10 will reach that level $L_1$ shown in FIG. 1. At this point it is necessary to have a foolproof arrangement whereby oil is prevented from being introduced into the gas transfer tubing 25 and thus into the manifold M where injury to the engine I could result. The special construction and mounting of the valve assembly 15 accomplishes this.

To explain, the assembly 15 includes a tubular housing 30 and a hollow mounting head 31 supporting said housing 30. The upper portion of the housing 30 forms a cavity or passageway 32 defining a seat at the upper end for a check valve element 33 urged to the seated position by spring 34. At the other end of the passageway 32 is formed a seat for a float valve element in the form of a ball 35 having a specific gravity less than the liquid L and a weight sufficiently light to be supported by vacuum across the face of the seat. The ball is preferably of neoprene rubber or some other material resistant to the liquid L being processed and so as to form a good tight seal at the seat with passageway 32. Thus, it can be seen that the valve assembly 15 includes a check valve and a float valve connected by a passageway 32.

When a vacuum is applied to the tubing 25 and assuming that ambient pressure is prevailing in the container 10, the check valve element 33 will be opened and the container evacuated of air. In other words, a low pressure or vacuum is generated in the container 10. When evacuation is complete, the spring 34 will urge the element 33 to the seated position and prevent the loss of vacuum should the pressure in the tubing 25 become greater than the vacuum already drawn. In other words, in the case of an internal combustion engine I, when the engine is accelerated or placed under a load, there will be no loss of vacuum from the container 10. Also, when the valve 26 has not yet been placed in the off position and the engine is turned off, there will still be no loss of vacuum condition in and below the passageway 32 in the container 10.

The valve assembly 15 is mounted on the container 10 so as to extend down into the reservoir portion and thus be communicable with the liquid L and is preferably at an angle $\theta$, which is approximately 22°. The angle of mounting of the valve assembly 15 is of importance to insure maximum operational efficiency of the float valve. First, with the container dry the ball 35 will also be dry and held in its captive position inside the housing 30 resting on cotter pin 36. As the liquid level rises the ball is floated up and because of its upward movement touches the inside upper wall 37 of the housing 30. As the ball continues to rise the frictional engagement with the wall causes the ball 35 to rotate and become substantially coated with liquid around the full surface area of the sphere.

The ball floats upwardly and is eventually seated (note dotted line position 35a) and thereafter continues to be pushed upwardly by the buoyant force. The lateral ports 38 in the housing 30 assure that the vacuum will be continually drawn up until the last second when the ball is buoyed into the final sealing position 35a. As the liquid level continues to rise, the buoyant force of the liquid, the hydrostatic pressure of the liquid and the diminishing vacuum in the unfilled portion of the container 10, tends to hold the ball 35 in the seated position 35a. This holding action is advantageously aided by the vacuum still present over the top of the ball 35 in the passageway 32 and maintained by the check valve element 33. In this manner, the valve assembly 15 affords a foolproof manner in which the liquid L will be maintained clear of the gas transfer tubing 25 and thus out of the manifold M of the engine I (see FIG. 2).

Now it is assumed that the maximum liquid level $L_2$ has been reached, which level is preferably gauged to be the same as necessary to accommodate the capacity of the oil pan P being emptied. At this point, the operator is required merely to close the valve 23 to complete the operation and to put the container in a foolproof standby condition with the liquid L at the final level $L_2$. The closing of the valve 23 interrupts longitudinal passage 40 that carries the liquid and in turn aligns a lateral port 41 (see FIG. 1a) with the branch pipe 22. An opening 42 in the valve 23 is then free to allow the atmospheric air through the passageway 40 past a check valve 43 and thus into the top of the container 10 above the liquid level $L_2$. The valve element of the valve 23 includes a single stop 45 that engages abuttments 46, 47 and thus limiting the valve 23 to the two desired positions. Once atmospheric pressure is regained inside the container 10, the check valve 43 will prevent the retrograde flow of liquid L out through the opening 42. Also, establishing ambient pressure in the container 10 assures that any new oil placed subsequently in the pan P is not withdrawn should the valve 23 be inadvertently opened.

The ball 35 in the position 35a is now maintained in the seated condition due to the differential pressure between the interior of the container 10 and the passageway 32, even if the liquid level is lowered again. Thus, any sloshing of the liquid L due to rocking of the boat in which it is installed or the pouring of the liquid L from the spout 11 will not of itself allow the ball 35 to become unseated. The seat is maintained by the differential pressure across the ball and no contamination of the gas transfer means is possible, even if the auxiliary valve 26 is failed to be closed by the operator. It should be noted that atmospheric pressure introduced in the container 10 is not mandatory for the proper operation of the ball 35 although such operation does serve an important function of maintaining the pressure differential at a greater and more fail-safe level.

The ball 35 is reset to the open position (resting on the cotter pin 36) by the novel concept of rapping or hitting the housing 31 with a sharp blow, as schematically denoted by the arrow 50 (FIG. 1). The blow may be imparted by a suitable instrument, such as a rubber headed hammer, or by the heel of the hand of the operator, as desired. The ball 35 has sufficient weight to continue downwardly because of its momentum upon the upward rebound of the remainder of the assembly 15. This breaking of the seal is assisted by the fact that the angle $\theta$ causes the ball 35 to assume downward, counterclockwise (FIG. 1) rotating motion and thus localized breakaway action at the uppermost point of engagement with the seal area. The ball will roll from position 35a to the bottom position along the lower inside surface until it engages the cotter pin 36. As shown, the length of the housing 30 is over two ball diameters or widths so that the ball will completely open the valve and also so that upon being reclosed the ball 35 will have sufficient distance to be thoroughly coated by the liquid that is to assist in forming the seal.

A rubber grommet and sealing member 51 supports the head 31 and the housing 30. In accordance with the invention, the valve assembly 15 is thus isolated from extraneous jarring forces to the container 10 thus avoiding any chance of inadvertent resetting of the valve assembly 15. Thus, no resetting will be performed until desired and in accordance with the preferred embodiment by rapping the housing 31 with a force 50, schematically shown.

In FIG. 3, there has been shown a perspective view of the sump container 10 with the attachments and valves on the top. Positioned at the sides of the T connection 20 in a protective manner are the handles 55, 56 that serve to make said container 10 easily portable.

In summary, it can be seen that a compact, simple and efficient system is provided whereby oil or other liquid may be transferred without encountering the usual difficulties. The float valve element 35 of the valve assembly 15 prevents the liquid L from entering the gas transfer tubing 25. The check valve 34 maintains the vacuum in the passageway 32 to assure the positioning of the ball 35 in the closed position 35a until it is intended that the valve be opened. Thus, once the check valve is automatically closed, it is impossible to cause damage to the engine I by forgetfullness of the operator. A positive act, conveying a blow to the valve assembly 15, is required to reset the valve ball 35. The angle $\theta$ assists the seating of the valve by coating the ball 35 with liquid, and also assists by breaking the seal at a single point. The valve 23 is actuated to turn off the flow of liquid, and to also subject the unfilled portion of the container 10 to atmospheric pressure to further insure the effectiveness of the seal of the ball 35.

In this disclosure, there is shown and described only the preferred embodiment of the invention, but, as aforementioned, it is to be understood that the invention is capable of use in various other combinations and environment and is capable of changes or modifications within the scope of the inventive concept as expressed herein.

We claim:

1. An apparatus for removing liquid from a source and depositing the same in a sump container by use of differential pressure established between said source and said container by a vacuum source comprising a liquid transfer means between said source and said container, gas transfer means connected to said container for evacuating said container in response to said vacuum source, and an integral dual purpose valve assembly mounted on said container and extending into the interior of said container for regulating the flow of gas therefrom, said valve assembly including check valve means to stop the reverse gas flow when the pressure in the container is less than that in said gas transfer means, and float valve means separate from said check valve means for blocking liquid that has reached a predetermined level so as to endanger sucking of said liquid into said gas transfer means, whereby liquid flow is prevented even when said predetermined level is substantially reached, said valve assembly including a connecting passage between the two valve means including respective seats therefor at opposite ends, said float valve means including a float member having a specific gravity less than said liquid and a weight sufficiently light to be supported by the vacuum supplied across the face of the seat formed by said connecting passage, whereby to prevent inadvertent reset of said float valve means upon changing of the level of said liquid in said container, means to introduce atmospheric pressure to said container after seating of said float member to assist in preventing inadvertent reset, means to interrupt the flow of liquid to said container along said liquid transfer means, said introducing means and said interrupter means being combined in a two-way valve, and check means in said introducing means to prevent flow of liquid from said container.

2. The apparatus of claim 1 wherein said float valve means has sufficient weight to cause the momentum thereof to break the seal with said connecting passage to reset in the open position in response to outside force in the form of a sharp rap on said valve assembly after removal of said liquid.

3. The apparatus of claim 2 wherein said valve assembly is mounted on said container by a combination shock absorbing cushion and sealing grommet to prevent inadvertent reset of said float valve means in response to an outside jarring force applied to said container.

4. The apparatus of claim 1 wherein said valve assembly extends at an acute angle with respect to the vertical within said container, said float valve means including a substantially free moving ball and a tubular housing for confining said ball in said assembly, whereby the holding vacuum within said connecting chamber may be more easily broken at a single point along the upper side of the seal by combined outside force and gravity, said ball assuming rolling reset action along the lower side of said housing.

5. The apparatus of claim 4 wherein said acute angle is approximately 22° from the vertical.

6. The apparatus of claim 4 wherein said ball is resilient to assure formation of a leak-proof seal.

7. The apparatus of claim 4 wherein said check valve means includes a flat disc to form a leak-proof seal and a spring to urge said disc into sealing relationship.

8. The apparatus of claim 4 wherein said tubular housing extends in length approximately at least two ball widths down into said container, whereby liquid will thoroughly coat the ball as it rolls up the upper inside face of the housing to assist in forming a leak-proof seal upon seating.

9. The apparatus of claim 1 wherein said liquid transfer means includes a T connection centrally mounted on the top of said container, gauge means and liquid cutoff valve means on said connection, and dual handles on the sides of said connection to protect the same and to provide portability to said container.

10. The apparatus of claim 1 wherein is further provided a pouring spout on the top of said container on the opposite side from said valve assembly and separate therefrom for disposing of said liquid and stopper means for sealing said spout.

* * * * *